June 9, 1931.  G. C. WOODRUFF  1,808,875
SECTIONAL FREIGHT CAR
Filed April 12, 1929  4 Sheets-Sheet 1
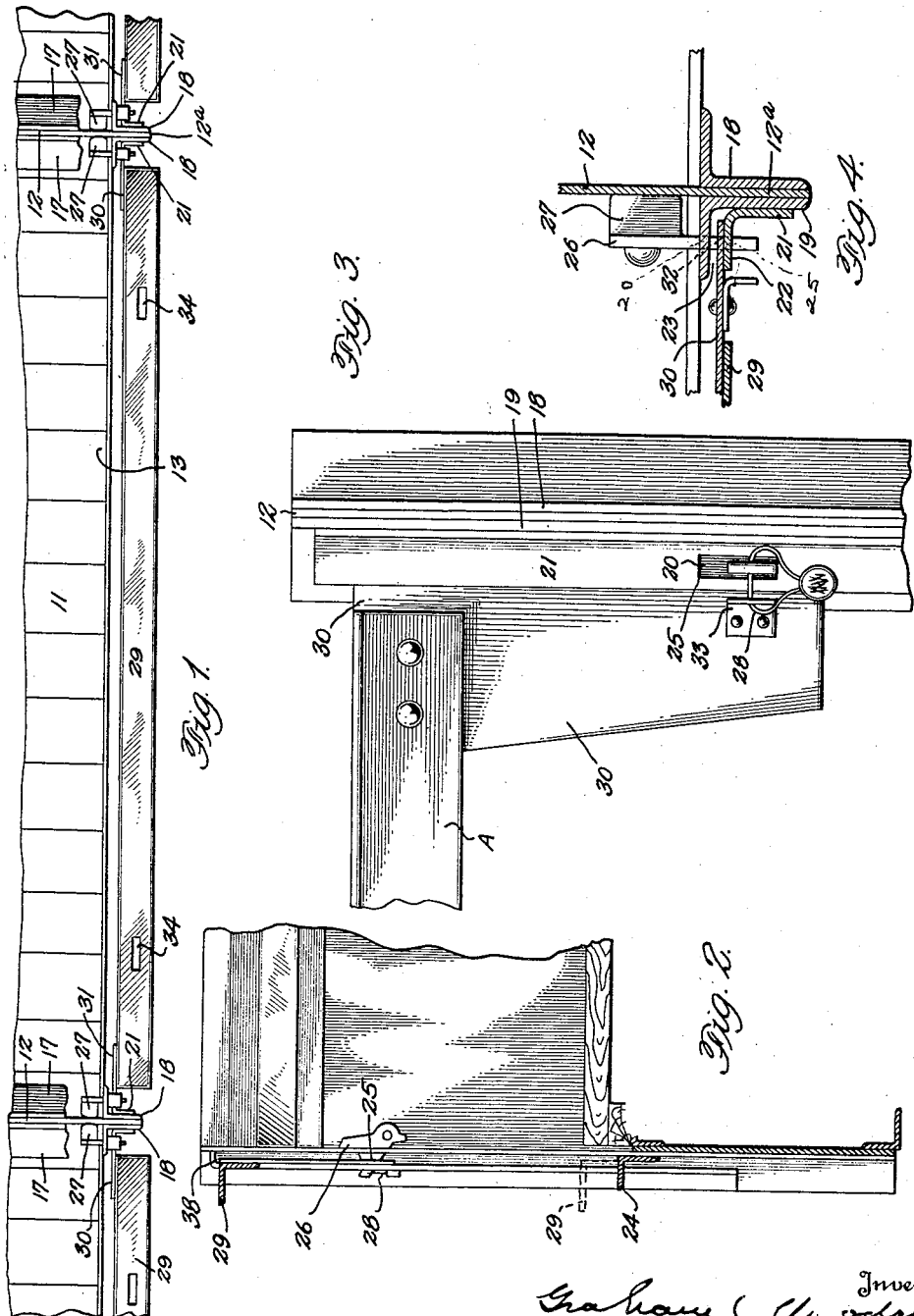

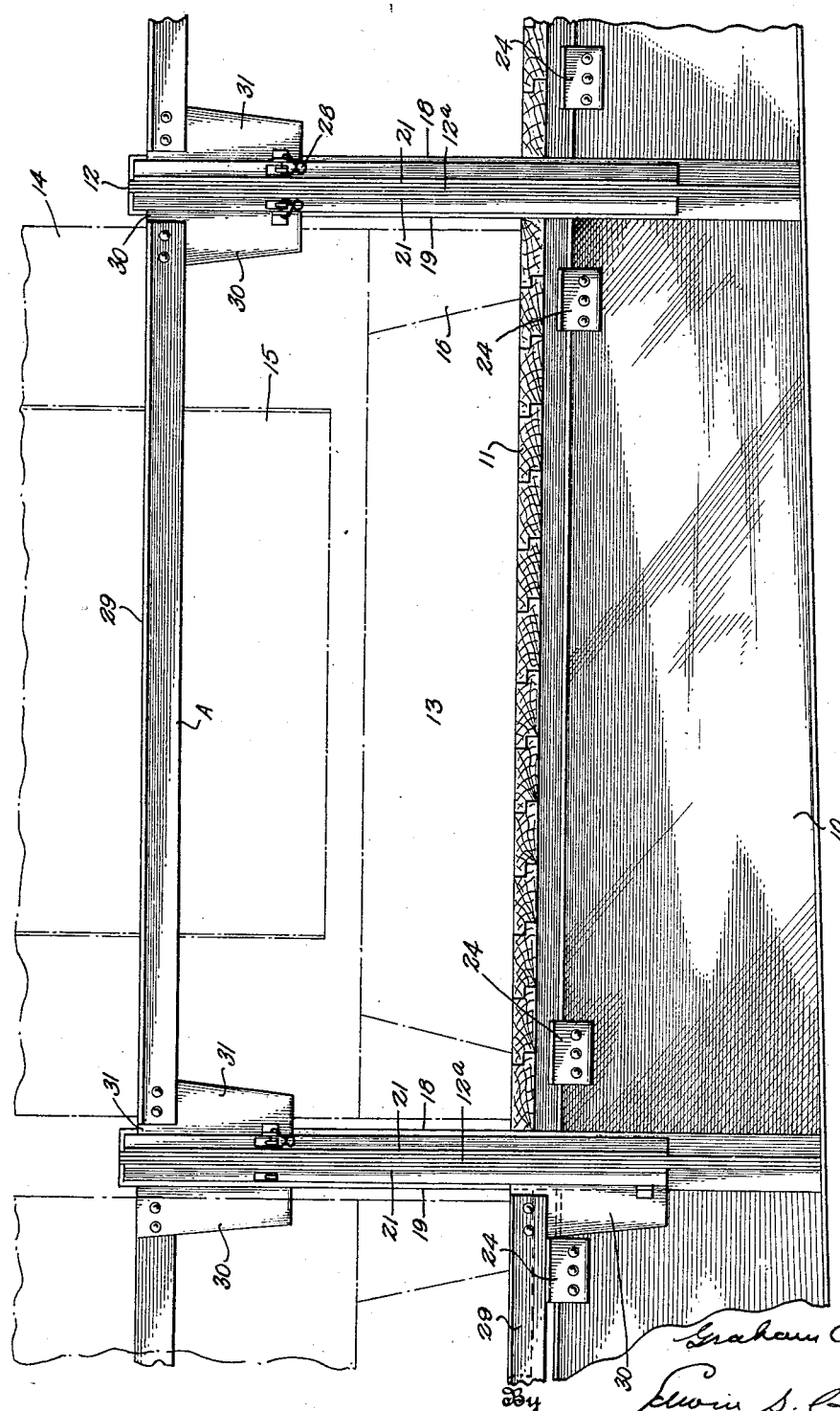

Inventor
Graham C. Woodruff
By Edwin S. Clarkson
Attorney

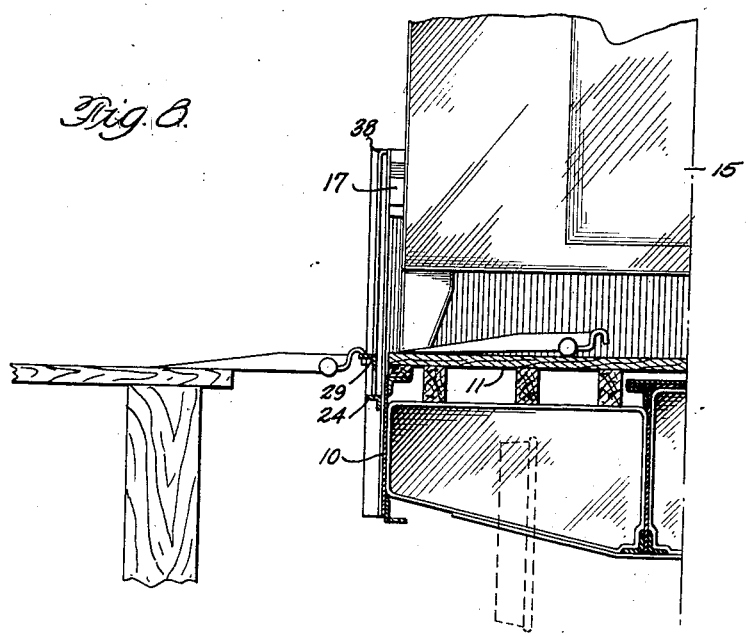
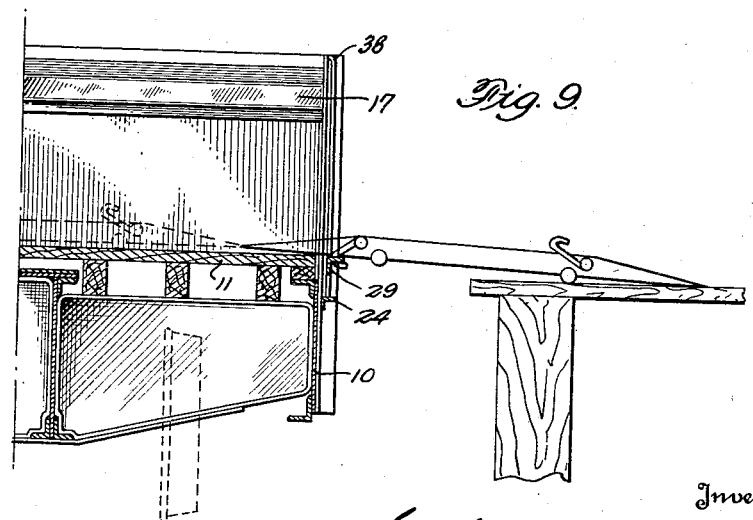

Patented June 9, 1931

1,808,875

UNITED STATES PATENT OFFICE

GRAHAM C. WOODRUFF, OF BRONXVILLE, NEW YORK, ASSIGNOR TO THE L. C. L. CORPORATION, A CORPORATION OF DELAWARE

SECTIONAL FREIGHT CAR

Application filed April 12, 1929. Serial No. 354,638.

The object of my invention is to provide protection in transit for various commodities in sectional car load containers of the general type shown in the Smith reissue Patent No. 16,073, and to facilitate loading and unloading of containers at points where special facilities, such as overhead cranes, are not provided for this purpose. Another object of my invention is to provide a car of this kind of less weight; and with these and other objects in view, my invention consists of the parts and combination of parts as will be hereinafter pointed out.

In the drawings:

Figure 1 is a detail top plan view of a car embodying my invention.

Figure 2 is a detail vertical sectional view.

Figure 3 is a detail front elevation of part of the post and slide bar.

Figure 4 is a detail horizontal sectional view of the posts, associated parts being in elevation.

Figure 5 is a detail side elevation of a car embodying my invention.

Figures 6, 7, 8 and 9 are vertical transverse sectional views of a car embodying my invention.

Figure 6:
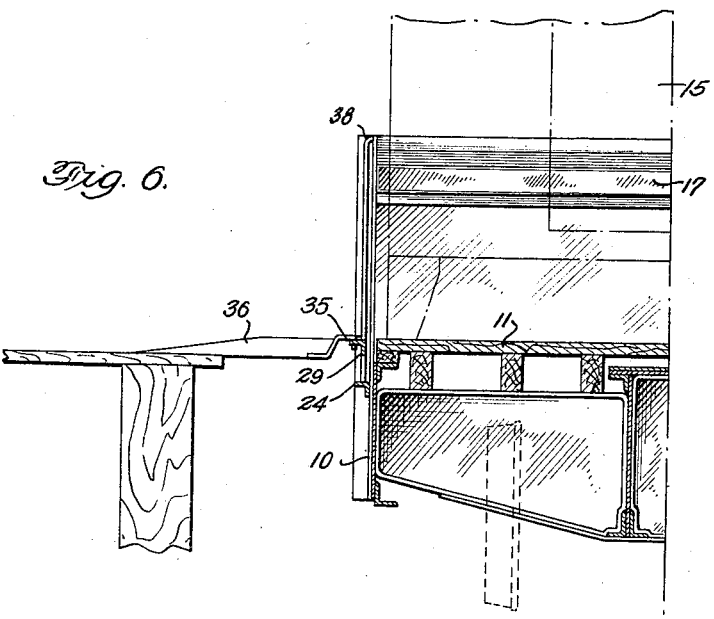

The reference numeral 10 designates a car of suitable underframe construction and having a floor 11.

The car is provided with a plurality of spaced bulkheads 12 extending transversely of the car from side to side and dividing the car into a plurality of compartments 13 each adapted to receive a merchandise container 14 having a door 15 and provided, if desired, with legs 16, the container being shown in dotted lines in the drawings. The bulkheads 12 are provided on each side of each compartment with a container guide 17 which functions to guide the container into and out of the compartment, and also holds the container from shifting on the floor when the car is subjected to buffing and pulling shocks in service conditions.

Preferably the ends of the bulkheads extend beyond the ends of the compartments as shown in Figures 1 and 2, and other figures of the drawings, as indicated at 12a. Commercial shape L bars 18 and 19 are secured by rivets, or otherwise, on each side of the projecting portion 12a of the bulkheads, the bar 19 being provided with an elongated keeper 20 formed therethrough. The arm 21 of an angle iron guide is secured to the angle bar 19, while the other arm 22 is spaced from the angle bar, as clearly shown in Figure 4 to form a vertical guide, or runway 23, extending from the top of the angle bars 18, 19, to a point below the car floor 11, as more clearly shown in Figure 2. At the bottom of the runway 23 I secure a stop 24. The arm 22 of the angle iron is provided with an elongated keeper 25 positioned in alignment with the keeper 20 of the angle bar 19. The extended portion 12a and the angle bars 18 and 19 constitute, when assembled, a post at each end of the bulkheads. On one bulkhead of each compartment I pivotally mount a gravity latch 26, preferably spaced from the face of the bulkhead by the spacing lug 27 to bring or position the latch in alignment with the keepers 20 and 25, as shown in Figure 4. It will be noted from Figure 2 that the pivot of the latch is so disposed relative to the weight of the latch that the latch will drop by gravity toward the side of the car and the force of gravity will hold it in the position shown in Figure 2 under all service conditions. The latch is provided with an opening through which the car seal wire 28 may freely pass.

A movable rail, or guard, 29 may be made of flat plate but I prefer to use angle iron for this purpose, as this shape has greater rigidity and resistance against thrusts, and in order to give greater rigidity to the rail 29 I secure at each end thereof metal gussets 30 and 31, the outer edges of which project beyond the ends of the rail 29 as shown in the drawings.

That portion of the gussets 30 and 31, which projects beyond the ends of the movable rail 29, extends into the guide or runway 23, as more clearly shown in Figure 4, and with the bar 29 they are adapted to slide vertically within the runway 23. When the bar 29 is in its elevated position shown in Figures 2 and 5 the keepers 20 and 25 are in alignment and the gravity latch projects through the keepers 20 and 25, and also through a keeper 32 in the gussets 30 and 31 thereby holding the bar 29 in its elevated position. If desired a car seal wire may be passed through an opening in the latch 26 and through an opening in a casting 33 secured on the gussets thereby locking the bar against unauthorized movement. When the bar 29 is in its elevated position it functions as a barrier or guard across the ends of the compartments 13 and holds the containers 14 from slipping endwise from the compartments while enroute. When it is desired to remove a container from its compartment on the car the seal is broken and the gravity latch thrown back out of its keepers whereupon the movable bar 29 may be moved downward in the runway 23 to the position indicated in dotted lines in Figure 2, and in full lines in Figures 6, 7, 8 and 9, in which position it is below or on the plane of the upper face of the floor 11. This bar may be provided with slots 34 to receive hooks 35 on runways 36 thereby locking the runways to the bar. The lower movement of the bar 29 is arrested by contact with the stops 24, which stops, if desired, may be secured to the side sills of the car.

Figure 7:
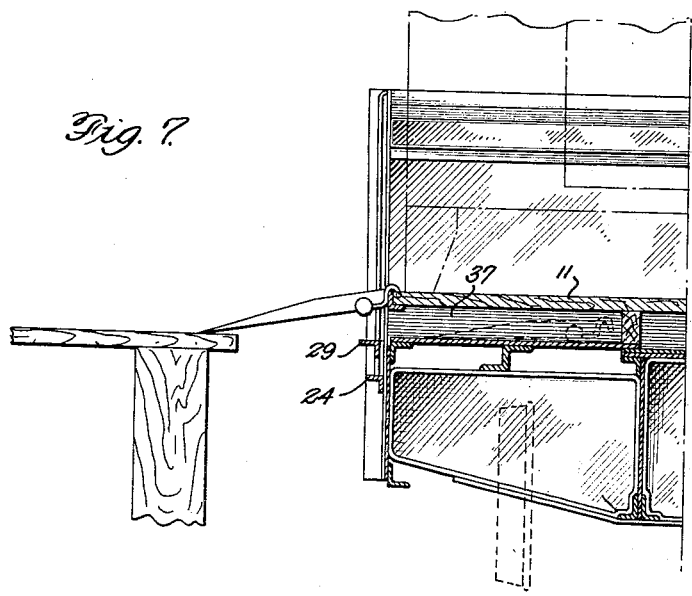

In Figure 7 I have shown a construction of car providing a storage space 37 under the car floor in which the runway 36 may be stored, and from which it may be readily moved and hooked into position at the side of the car for the purpose of removing the containers from the car to the station platform.

In Figures 8 and 9 I have shown the runway stored between the legs of the container.

As shown in Figure 5 I may arrange the container door adjacent the movable bar 29, or as shown in Figures 6, 7 and 8 I may arrange the container door adjacent the transverse bulkheads of the car so that it will be impossible to open the container door while the container remains in position on the car.

Suitable stops 38 are provided at the top of the runways 23 to limit the upward movement of the movable rail 29.

The car built according to my invention enables the loading and unloading of merchandise containers at stations not provided with cranes, besides which the construction of car results in the lighter weight car with its resultant savings, both in construction and transportation and maintenance.

I am aware that changes may be made in the details of construction without departing from the spirit of my invention and the scope of the appended claims.

What I claim is:

1. In a freight car the combination of bulkheads transversely disposed on the car in spaced relation to form a plurality of compartments on the car, posts at both ends of each bulkhead, vertical runways on each post, a bar extending across the end of each compartment and slidably mounted in said runways, a gravity lock in said runway to hold the bar in closed position to the posts.

2. In a freight car, the combination with bulkheads transversely disposed on the car in spaced relation to form a plurality of compartments on the car, posts at each end of each bulkhead, a bar extending across the end of each compartment, and slidably mounted in said runways, a latch mounted on the bulkhead adapted to engage and hold the bar in its elevated position at the top of the posts.

3. In a freight car, the combination of bulkheads transversely disposed on the car in spaced relation to form a plurality of compartments on the car, a post on each end of said bulkheads, an angle iron secured with one of its arms in spaced relation to said post to form a vertical runway from top to bottom of the post, a bar for each compartment slidably mounted at its ends in said runway, and means to lock the bar in position at the top of the posts.

4. In a freight car, the combination of bulkheads transversely disposed on the car in spaced relation to form a plurality of compartments on the car, a post on each end of said bulkheads, an angle iron secured with one of its arms in spaced relation to said post to form a vertical runway from top to bottom on the post, a keeper in the spaced arm of the said angle iron, a latch suitably mounted on the bulkhead, a bar for each compartment slidably mounted in said vertical runways, a keeper carried by said bar, said lock being adapted to engage the keepers on the said angle iron and the said bar to hold the bar in its elevated position at the top of the posts.

5. In a freight car, the combination of bulkheads transversely disposed on the car in spaced relation to form compartments on the car, posts at the ends of said bulkheads, a keeper in each post, an angle iron secured to the post with one of its arms in spaced relation to the post to form a vertical runway from top to bottom of the post, a keeper in said spaced arm, a bar slidably mounted in said runway, a keeper carried by said bar, a lock suitably mounted and adapted to engage said keepers to hold the bar in elevated position at the top of said posts.

6. In a freight car, the combination of bulkheads transversely disposed on the car in spaced relation to form a plurality of compartments on the car, L shaped bars secured on opposite end faces of the bulkheads, constituting posts, a keeper in one of said angle bars, a latch pivotally secured on the bulkhead, an angle iron secured to said post with one of its arms in spaced relation to the post to form a vertical runway from the top to the bottom of the post, a keeper in said spaced arm, a bar extending across the end of each compartment, gussets secured to the ends of the bar and slidably mounted in said runways, a keeper in said gussets, said latch being adapted to engage said keepers to lock the bar in position at the top of the posts.

7. In a freight car, the combination of bulkheads transversely disposed on the car in spaced relation to form a plurality of compartments on the car, L shaped bars secured on opposite end faces of the bulkheads, constituting posts, a keeper in one of said angle bars, a latch pivotally secured on the bulkhead, an angle iron secured to said post with one of its arms in spaced relation to the post to form a vertical runway from the top to the bottom of the post, a keeper in said spaced arm, a bar extending across the end of each compartment, gussets secured to the ends of the bar and slidably mounted in said runways, a keeper in said gussets, said latch being adapted to engage said keepers to lock the bar in position at the top of the posts, a seal plate on the bar, and a car seal locking said plate and the said latch together.

In testimony whereof I affix my signature.

GRAHAM C. WOODRUFF.